July 22, 1969  A. G. BODINE  3,456,885
SONIC METHOD AND APPARATUS FOR DEMOLITION OF STRUCTURES
Filed Oct. 19, 1965  5 Sheets-Sheet 1
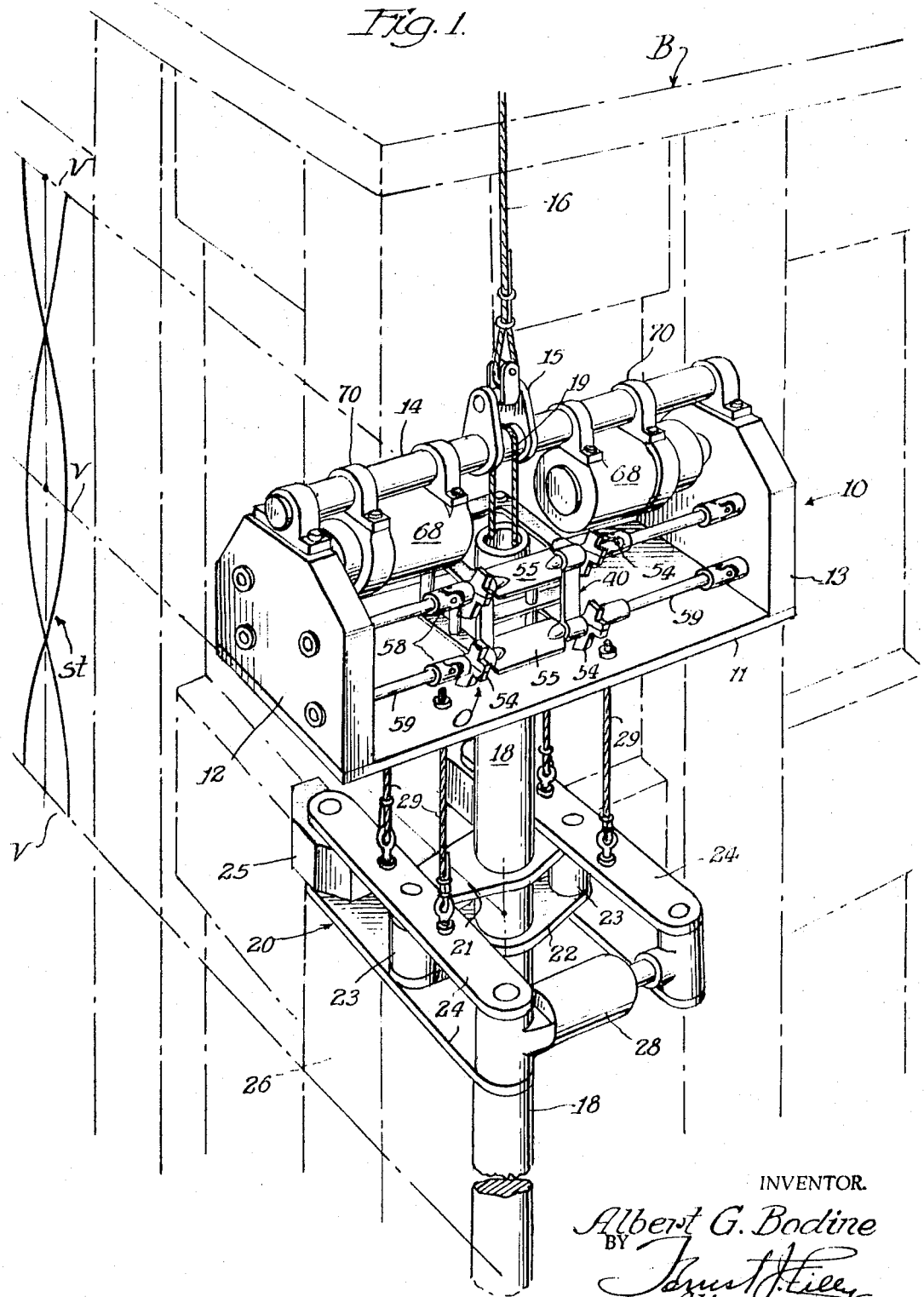
INVENTOR.
Albert G. Bodine
BY
Attorney.

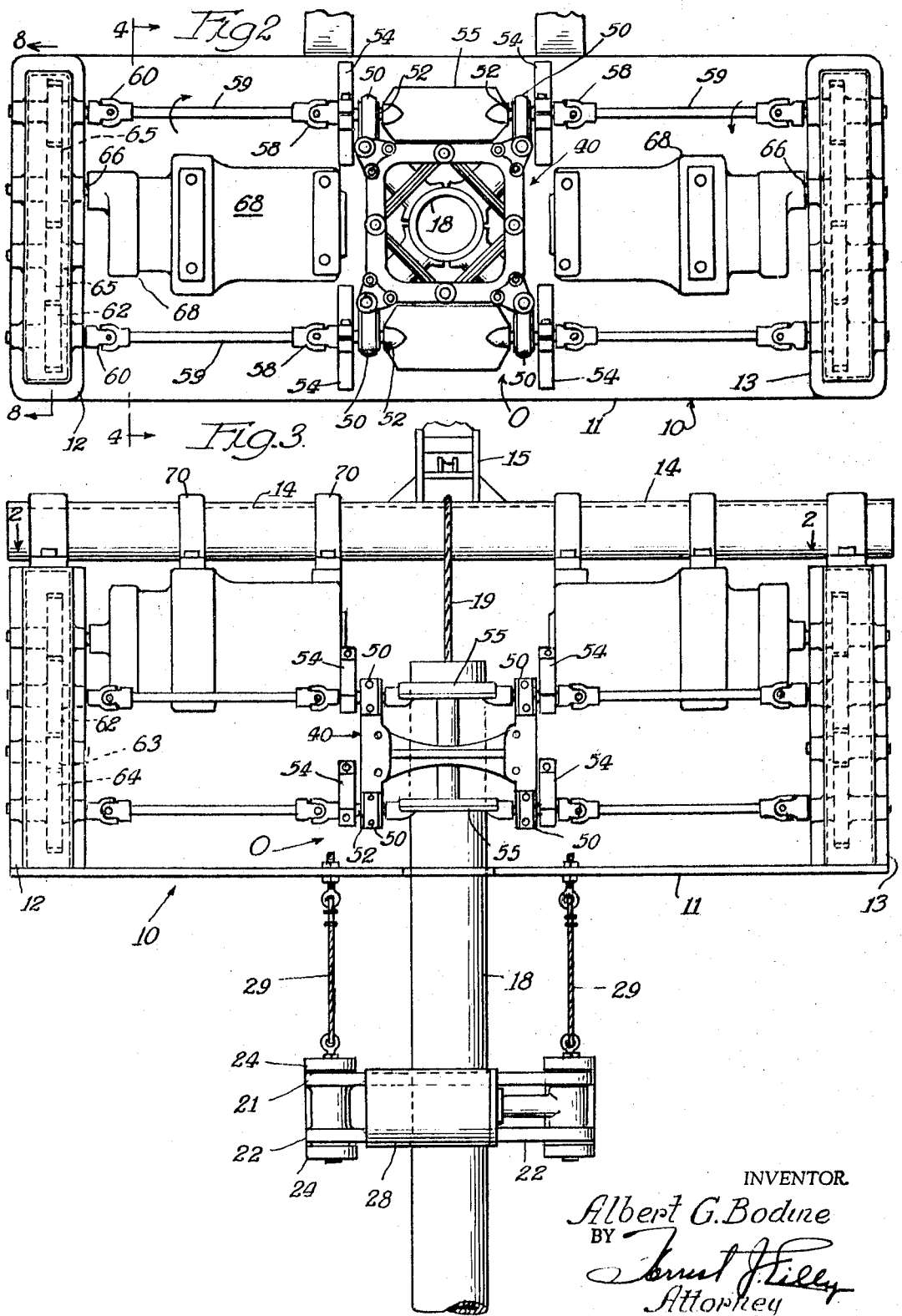

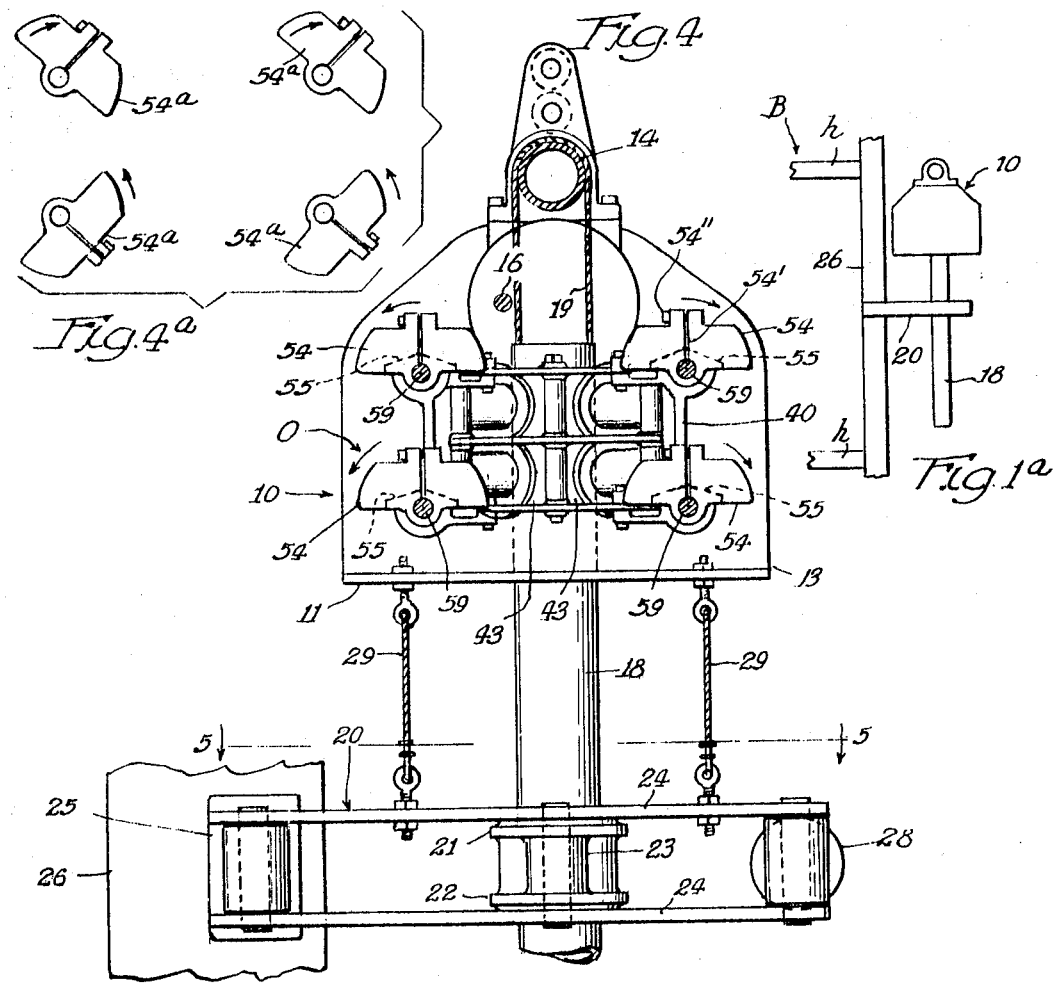
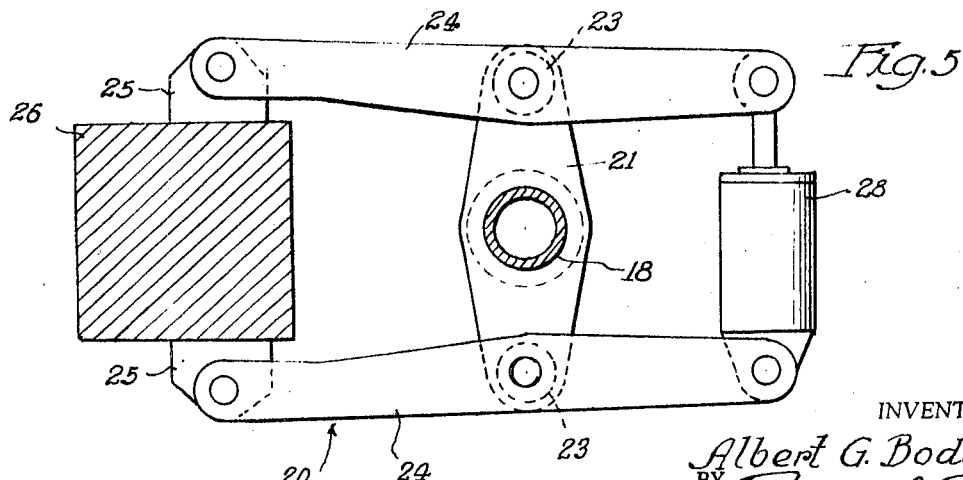

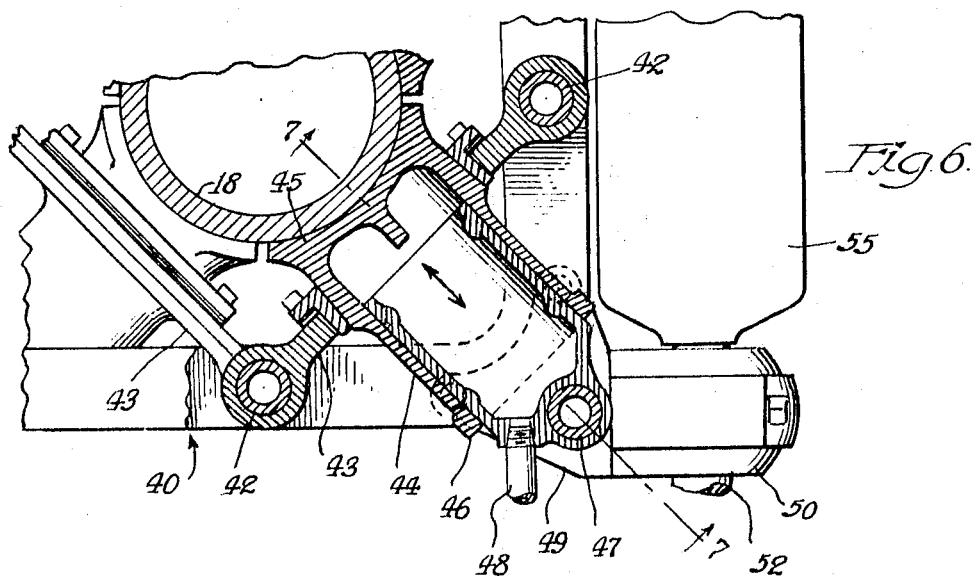
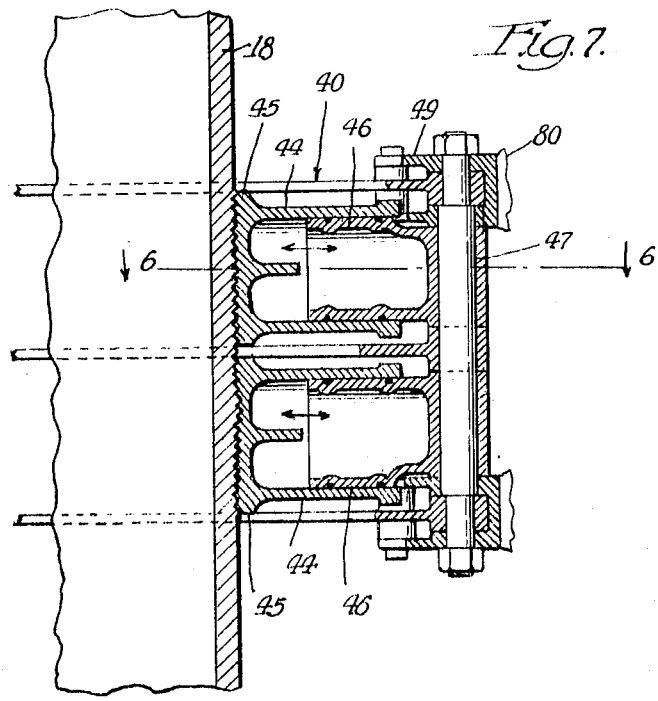

July 22, 1969  A. G. BODINE  3,456,885
SONIC METHOD AND APPARATUS FOR DEMOLITION OF STRUCTURES
Filed Oct. 19, 1965  5 Sheets-Sheet 5
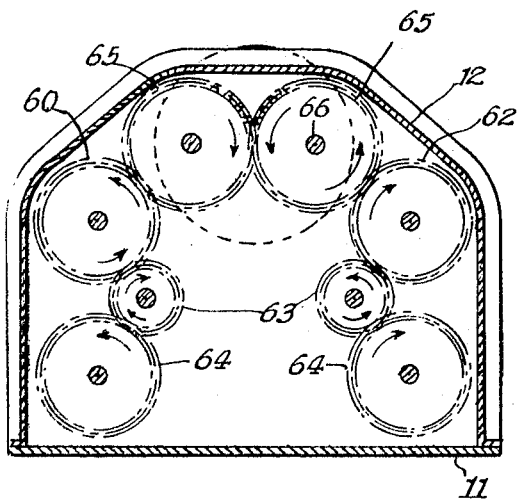
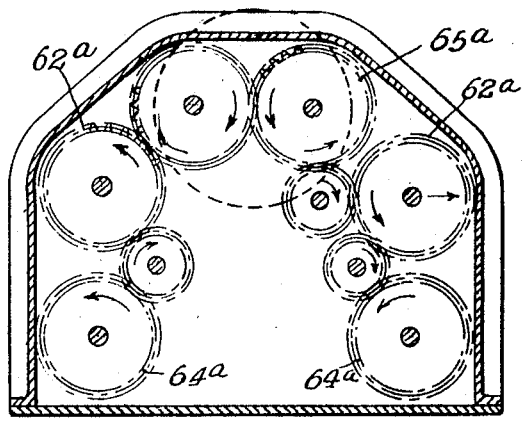
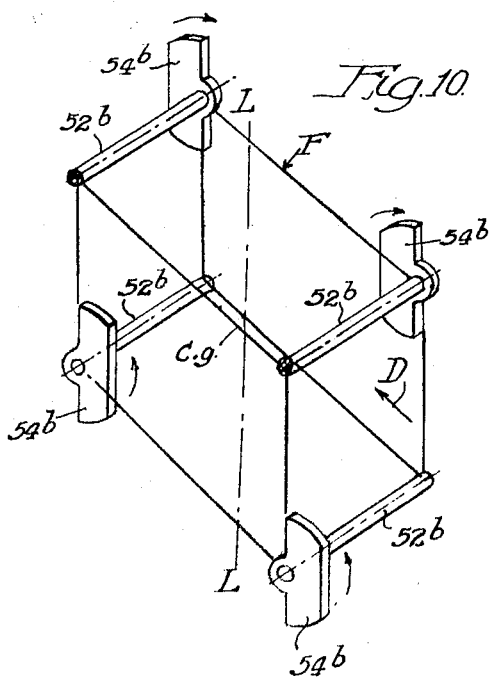
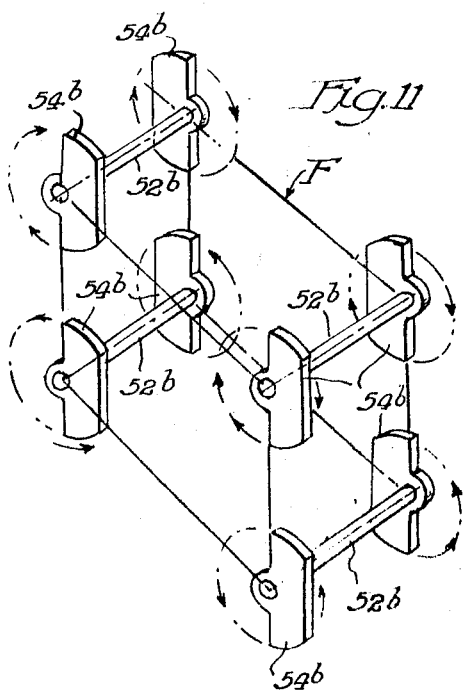
INVENTOR.
Albert G. Bodine
BY
Forrest J. Filler
Attorney

United States Patent Office 3,456,885
Patented July 22, 1969

3,456,885
SONIC METHOD AND APPARATUS FOR DEMOLITION OF STRUCTURES
Albert G. Bodine, Los Angeles, Calif.
(7877 Woodley Ave., Van Nuys, Calif. 91406)
Filed Oct. 19, 1965, Ser. No. 498,038
Int. Cl. B02c 19/00, 23/00; B06b 1/16
U.S. Cl. 241—1                     15 Claims

ABSTRACT OF THE DISCLOSURE

A device and method for the demolition of building structures and the like, utilizing a mechanical oscillator which is connected to a separate elastic resonator stem. Additionally affixed to the stem is a clamp for suitable attachment to the structure being demolished. The stem transmits the vibration emitted from the oscillator through the clamp to the building.

---

This invention relates generally to the demolition of large building structures, bridges and the like, which are to be torn down, by application thereto of high-intensity sonic energy.

Static structures, such as buildings, bridges, etc., are not normally designed for sustained dynamic vibration at high intensity. Vibration of such structures involves elastic vibratory bending, and failure of the structure can result from a vibration amplitude so high as to disrupt the structure, as by bending its components beyond their elastic limit, with consequent fracturing of fastenings, progressively increasing distortions and instability, leading to collapse, or by repetition of cyclic elastic deformation to the point of elastic fatigue failure. Building structures are designed to resist windage, as well as the elastic vibrations resulting from earthquakes. They are not, however, designed to withstand substantially sustained elastic vibrations at high intensities. The ordinary building structure is thus relatively "brittle," and readily subject to large bending of components beyond the elastic limits thereof, particularly when vibrated at resonance, to fracture of fastenings, and to elastic fatigue failure.

The object of the present invention is to provide a process and a machine for destroying building structures by applying thereto a powerful oscillator capable of elastically shaking the building at high vibration amplitude, and at resonance, over a time period sufficient for demolition.

Under the conditions of operation of the present invention, the building structure, with the various elasticities and inertiae of its components, behaves as a large "acoustic circuit" of an irregularly distributed constant type. That is to say, the elasticities and masses or inertiae of the various components integrated into the building structure create a network of elastic and mass elements, and the term "distributed constant" of course refers to the individual elastic and mass elements distributed throughout the building network or circuit. This acoustic network or circuit as a whole has at least one resonant frequency at which the reactances owing to the elasticities and masses are equal to one another; and by applying a proper periodic force to the building at this resonant frequency, large vibration amplitudes are set up in the structure, with ruptures and fracturing taking place at fastenings and within members where over-stressing occurs and where elastic fatique procceds to the point of failure. Actually, the equivalent circuit or network constituted by the building may have a number of vibration modes, with a resonant frequency for each, and any of this can be energized by a properly selected and applied periodic input force.

Broadly, then, the invention comprises the acoustic coupling to such a building structure of a generator of a large periodic force, referred to herein as an oscillator, and preferably, for reasons which will appear later, an oscillator of an orbiting mass type as will further be explained.

It also is a feature of the invention that this oscillator or sonic machine be acoustically coupled to the building structure at a region in the latter which has an impedance reasonably matched to the output impedance of the oscillator. The term "impedance," defined more specifically hereinafter, refers broadly to the ratio of the amplitude of an oscillating force applied to a vibratory member, and the amplitude of vibratory motion thereby obtained. A mechanical oscillator of the type herein used has a predetermined or normal output impedance, and for best practice of the invention, this output impedance is somewhat matched to the impedance presented by the building structure at the point of acoustic coupling of the oscillator to the latter. This is important to the delivery of large sonic energy from the oscillator to the building. Assuming that the impedance presented by the building component to which the oscillator is coupled is an impedance of the resonant acoustic network or circuit constituted by the building structure, and assuming further that the output frequency of the oscillator is tuned or adjusted to the resonant vibration frequency of the building structure, the net result is that an acoustic standing wave pattern is created throughout the structure, with velocity antinodes (regions of maximized vibration amplitude) located at various points in the structure, and of course with nodes, i.e. stress antinodes regions of maximized cyclic stress amplitude) located at other points in the tructure. Wherever the velocity antinode regions of the standing wave, or in some cases the stress antinodes of the wave, coincide approximately with regions of low structural strength of the building against elastic vibration, and of course against elastic vibration fatigue, there rapidly ensue such effects as violent high-amplitude vibration, over-stressing, bending beyond the elastic limit, fracturing, breakage and fatigue failure.

The oscillators preferably used in the invention are orbiting mass types, in the present illustrative case, eccentrically weighted rotors, whose centers of gravity travel orbital paths, and which have the characteristic that they automatically seek out and lock into a major resonant standing wave frequency fo the structure or acoustic circuit to which they are coupled. The whole system thus behaves in effect as an acoustic resonant system having all of the discrete requirements of elastic compliance, mass, and resistance, as well as impedance matching between oscillator and the resonant system driven thereby.

Such a system utilizing sonic energy for building demolition avoids the inconvenience of the usually used large crane swinging a weight or ball for hammer-type impact, as is currently in practice. These swinging weights are very dangerous in that they cause pieces to fly for long distances. In addition, the crane and its associated structure require substantial space around the outside of the building.

By contrast, the sonic demolition technique of the present invention makes possible the connection of an oscillator to a properly selected point of a building and then the controlled application of sonic energy until various fatique conditions appear and take effect throughout the structure, all with a minimum of expense, danger, space utilization, as well as noise. With the invention, it is possible to observe progressing conditions while exercising a degree of control hitherto impossible with the swinging battering ram type of operation heretofore known. Thus it is possible by the present sonic technique to weaken a building to a controlled degree, so that various pull-down means can then be used for final easy disassembly. On the other hand, it is possible to run the sonic energy until the building collapses, and then, if necessary, to apply the sonic oscillator to subassemblies that may still remain somewhat intact, so that these can be further reduced in size, so as to be easily carted away.

Sonic discussion

Certain acoustic phenomena disclosed in the foregoing and hereinafter, are, generally speaking, outside the experience of those skilled in the acoustics art. To aid in a full understanding of these phenomena by those skilled in the acoustics art, and by others, the following general discussion, including definition of terms, is deemed to be of importance.

By the expression "sonic vibration" I mean elastic vibrations, i.e. cyclic elastic deformations, such as longitudinal, lateral, gyratory, torsional, etc., generated in a structure, or which travel through a medium with a characteristic velocity of propagation. If these vibrations travel longitudinally, or create a longitudinal wave pattern in a medium or structure having uniformly distributed constants of elasticity and mass, this is sound wave transmission. Regardless of the vibratory frequency of such sound wave transmission, the same mathematical formulae apply, and the science is called sonics. In addition, there can be elastically vibratory systems wherein the essential features of mass appear as a localized influence or parameter, known as a "lumped constant"; and another such lumped constant can be a localized or concentrated elastically deformable element, affording a local effect referred to variously as elasticity, modulus, modulus of elasticity, stiffness, stiffness modulus, or compliance, which is the reciprocal of the stiffness modulus. Fortunately, these constants, when functioning in an elastically vibratory system such as mine, have cooperating and mutual influencing effects like equivalent factors in alternating-current electrical systems. In fact, in both distributed and lumped constant systems, mass is mathematically equivalent to inductance (a coil); elastic compliance is mathematically equivalent to capacitance (a condensor); and friction or other pure energy dissipation is mathematically equivalent to resistance (a resistor).

Because of these equivalents, my elastic vibratory systems with their mass and stiffness and energy consumtion, and their sonic energy transmission properties, can be viewed as equivalent electrical circuits, where the functions can be expressed, considered, changed and quantitatively analyzed by using well proven electrical formulae.

It is important to recognize that the transmission of sonic energy into the interface or work area between two parts to be moved against one another requires the above mentioned elastic vibration phenomena in order to accomplish the benefits of my invention. There have been other proposals involving exclusively simple bodily vibration of some part. However, these latter do not result in the benefits of my sonic or elastically vibratory action.

Since sonic or elastic vibration results in the mass and elastic compliance elements of the system taking on these special properties akin to the parameters of inductance and capacitance in alternating-current phenomena, wholly new performances can be made to take place in the mechanical arts. The concept of acoustic impedance becomes of paramount importance in understanding performances. Here impedance is the ratio of cyclic force or pressure acting in the media to resulting cyclic velocity or motion, just like the ratio of voltage to current. In this sonic adaptation impedance is also equal to media density times the speed of propagation of the elastic vibration.

In this invention impedance is important to the accomplishment of desired ends, such as where there is an interface. A sonic vibration transmitted across an interface between two media or two structures can experience some reflection, depending upon differences of impedance. This can cause large relative motion, if desired, at the interface.

Impedance is also important to consider if optimized energization of a system is desired. If the impedances are adjusted to be matched somewhat, energy transmission is made very effective.

Sonic energy at fairly high frequency can have energy effects on molecular or crystalline systems. Also, these fairly high frequencies can result in very high periodic acceleration values, typically of the order of hundreds or thousands of times the acceleration of gravity. This is because mathematically acceleration varies with the square of frequency. Accordingly, by taking advantage of this square function, I can accomplish very high forces with my sonic systems. My sonic systems preferably accomplish such high forces, and high total energy, by using a type of orbiting mass sonic vibration generator taught in my Patent No. 2,960,314, which is a simple mechanical device. The use of this type of sonic vibration generator in the sonic system of the present invention affords an especially simple, reliable, and commercially feasible system.

An additional important feature of these sonic circuits is the fact that they can be made very active, so as to handle substantial power, by providing a high Q factor. Here this factor Q is the ratio of energy stored to energy dissipated per cycle. In other words, with a high Q factor, the sonic system can store a high level of sonic energy, to which a constant input and output of energy is respectively added and subtracted. Circuit-wise, this Q factor is numerically the ratio of inductive reactance to resistance. Moreover, a high Q system is dynamically active, giving considerable cyclic motion where such motion is needed.

Certain definitions should now be given:

Impedance, in an elastically vibratory system, is, mathematically, the complex quotient of applied alternating force and linear velocity. It is analogous to electrical impedance. The concise mathematical expression for this impedance is $$Z = R + \sqrt{-1}\left(2\pi f M - \frac{1}{2\pi f C}\right)$$

where M is vibratory mass, C is elastic compliance (the reciprocal of stiffness, or of modulus of elasticity) and $f$ is the vibration frequency.

Resistance is the "real" part R of the impedance, and represents energy dissipation, as by friction.

Reactance is the "imaginary" part of the impedance, and is the difference of mass reactance and compliance reactance.

Mass reactance is the positive imaginary part of the impedance, given by $2\pi f M$. It is analogous to electrical inductive reactance, just as mass is analogous to inductance.

Elastic compliance reactance is the negative imaginary part of impedance, given by $$\frac{1}{2\pi f C}$$

Elastic compliance reactance is analogous to electrical capacitative reactance, just as compliance is analogous to capacitance.

Resonance in the vibratory circuit is obtained at the operating frequency at which the reactance (the algebraic sum of mass and compliance reactances) becomes zero. Vibration amplitude is limited under this condition to resistance alone, and is maximized. The inertia of the mass elements necessary to be vibrated does not under this condition consume any of the driving force.

A valuable feature of my sonic circuit is the provision of enough extra elastic compliance reactance so that the mass or inertia of various necessary bodies in the system does not cause the system to depart so far from resonance that a large proportion of the driving force is consumed and wasted in vibrating this mass. For example, a mechanical oscillator or vibration generator of the type normally used in my inventions always has a body, or carrying structure, for containing the cyclic force generating means. This supporting structure, even when minimal, still has mass, or inertia. This inertia could be a force-wasting detriment, acting as a blocking impedance using up part of the periodic force output just to accelerate and decelerate this supporting structure. However, by use of elastically vibratory structure in the system, the effect of this mass, or the mass reactance resulting therefrom, is counteracted at the frequency for resonance; and when a resonant acoustic circuit is thus used, with adequate capacitance (elastic compliance reactance), these blocking impedances are tuned out of existence, at resonance, and the periodic force generating means can thus deliver its full impulse to the "work," which is the resistive component of the impedance.

Sometimes it is especially beneficial to couple the sonic oscillator at a low-impedance (high-velocity vibration) region, for optimum power input, and then have high impedance (high-force vibration) at the work point. The sonic circuit is then functioning additionally as a transformer, or acoustic lever, to optimize the effectiveness of both the oscillator region and the work delivering region.

For very high-impedance systems having high Q at high frequency, I sometimes prefer that the resonant elastic system be a bar of solid material such as steel. For lower frequency or lower impedance, especially where large amplitude vibration is desired, I use a fluid resonator. One desirable specie of my invention employs, as the source of sonic power, a sonic resonant system comprising an elastic member in combination with an orbiting mass oscillator or vibration generator, as above mentioned. This combination has many unique and desirable features. For example, this orbiting mass oscillator has the ability to adjust its input power and phase to the resonant system so as to accommodate changes in the work load, including chnages in either or both the reactive impedance and the resistive impedance. This is a very desirable feature in that the oscillator "hangs on" to the load even as the load changes.

It is important to note that this unique advantage of the orbiting mass oscillator accrues from the combination thereof with the acoustic resonant circuit, so as to comprise a complete acoustic system. In other words, the orbiting mass oscillator is matched up to the resonant part of its system, and the combined system is matched up to the acoustic load, or the job to be accomplished. One manifestation of this proper matching is a characteristic whereby the orbiting mass oscillator tends to "lock in" to the resonant frequency of the resonant part of the system.

The combined system has a unique performance which is exhibited in the form of a greater effectiveness and particularly greater persistance in a sustained sonic action as the work process proceeds or goes through phases and changes of conditions. The orbiting mass oscillator, in this matched-up arrangement, is able to hang on to the load and continue to develop power as the sonic energy absorbing environment changes with the variations in sonic energy absorption by the load. The orbiting mass oscillator automatically changes its phase angle, and therefore its power factor, with these changes in the resistive impedance of the load.

A further important characteristic which tends to make the orbiting mass oscillator hang on to the load and continue the development of effective power, is that it also accommodates for changes in the reactive impedance of the acoustic environment while the work process continues. For example, if the load tends to add either inductance or capacitance to the sonic system, then the orbiting mass oscillator will accommodate accordingly. Very often this is accommodated by an automatic shift in frequency of operation of the orbiting mass oscillator by virtue of an automatic feedback of torque to the energy source which drives the orbiting mass oscillator. In other words, if the reactive impedance of the load changes this automatically causes a shift in the resonant response of the resonant circuit portion of the complete sonic system. This in turn causes a shift in the frequency of the orbiting mass oscillator for a given torque load provided by the power source which drives the orbiting mass oscillator.

All of the above mentioned characteristics of the orbiting mass oscillator are provided to a unique degree by this oscillator in combination with the resonant circuit. As explained elsewhere in this discussion the kinds of acoustic environment presented to the sonic source by this invention are uniquely accommodated by the combination of the orbiting mass oscillator and the resonant system. As will be noted, this invention involves the application of sonic power which brings forth some special problems unique to this invention, which problems are primarily a matter of delivering effective sonic energy to the particular work process involved in this invention. The work process, as explained elsewhere herein, presents a special combination of resistive and reactive impedances. These circuit values must be properly met in order that the invention be practiced effectively.

Reference is now directed to the drawings showing certain present illustrative embodiments of the invention. In the drawings:

FIG. 1 is a perspective view of a sonic demolition machine in accordance with the invention, shown suspended in operative engagement with a component of a building structure;

FIG. 1a is a diagrammatic illustration, showing application of the sonic machine of the invention to a fragmentary portion of a typical building structure;

FIG. 2 is a plan view of the sonic machine of FIG. 1, the mounting pipe for the prime movers being removed;

FIG. 3 is a side elevational view of the sonic machine;

FIG. 4 is a vertical transverse section taken on line 4—4 of FIG. 2;

FIG. 4a is a view similar to a portion of FIG. 4, showing a modified arrangement of unbalanced weights;

FIG. 5 is a section taken in accordance with line 5—5 of FIG. 4;

FIG. 6 is a horizontal section of a fragmentary portion of the means for clamping the oscillator frame to the stem, being a view taken in accordance with line 6—6 of FIG. 7;

FIG. 7 is a fragmentary sectional view taken in accordance with line 7—7 of FIG. 6;

FIG. 8 is a vertical transverse section taken in accordance with line 8—8 of FIG. 2;

FIG. 9 is a view similar to FIG. 8 but showing a modification;

FIG. 10 is a diagrammatic view of an oscillator similar to that of the preceding figures, but showing a modified arrangement of unbalanced weights; and FIG. 11 is a view similar to FIG. 10 but showing another modification.

In the drawings, a typical sonic machine in accordance with the invention is designated generally by the numeral 10. Here it comprises a platform 11, with end gear housings 12 and 13, erected at each end thereof, and forming part of a frame structure. Horizontally across the top, between the gear housings 12 and 13, is a steel pipe 14, at the center of which is a hanger structure 15 adapted for suspension by a steel cable 16 understood to be suspended, in turn, from any suitable crane. A vertical steel elastic coupling pipe or stem 18 extends with clearance through an aperture in the center of platform 11, its upper extremity rising somewhat thereabove, as shown, and being suspended by means of a cable 19 looped over the frame pipe 14. This coupling stem is readily interchangeable with other stems, either longer or shorter, stiffer or heavier, to accommodate the characteristics of different building structures to be demolished. Below the platform 11, the vertical stem 18 supports, here at its vertical mid-point, a clamping means 20 for clamping to a component of the building structure. The clamping means includes illustratively a pair of vertically spaced plates 21 and 22 which are welded to the pipe 18, each of said plates extending oppositely from the pipe 18, as shown. The corresponding extremities of the plates 21 and 22 furnish fulcrum mountings at 23 for a pair of clamp lever structures 24, and corresponding ends of the latter are equipped with pivoted jaws 25 adapted for clamping engagement with a vertical building column or other component such as represented at 26. The clamp levers 24 are moved to compress the jaws 25 against the column 26 by means of a hydraulic jack 28 connected between the opposite extremities of the clamp levers 24, as clearly shown. The clamp levers 24 are shown to be supported from the machine platform 11 as by means of suspension cables 29.

The upper extremity of the vertical stem 18 is rigidly clamped by the vibration output means of a presently described sonic oscillator, generally designated by O.

The oscillator has a box-frame structure 40 above platform 11 and around the stem 18 above said platform, and the adjacent sides of the box structure are, as here shown, respectively parallel and at right angles to the longitudinal edges of platform 11. Connected to the box frame at midpoint regions of the four sides thereof are vertical pins 42 which mount diagonally oriented clamp frame plates 43 to this box structure 40. There are two sets of four each of these frame plates 43, one set above the other; and each plate is apertured to receive a clamping cylinder 44 carrying an arcuate and preferably serrated pipe-engaging jaw 45.

Each clamping cylinder 44 telescopically slides on the outside of a hydraulic cylinder 46, the closed outer end of which is connected to box frame 40 by a vertical pin 47. Hydraulic fluid admitted to the cavity inside these cylinders 44 and 46, as via a line 48 connected into cylinder 46 from a suitable source of hydraulic pressure, not shown, forces the cylinder 44 in the direction of stem 18, so that jaw 45 clampingly engages the stem. By actuating all of the hydraulic clamping cylinders simultaneously, the stem 18 thus is engaged simultaneously by eight clampingly jaws and thus is firmly and rigidly coupled to the box-frame structure 40 mentioned above.

Mounted at the corners of the box-frame structure 40 through bracing fixtures 49 and the pins 47, are upper and lower bearings 50 for eight horizontal and parallel oscillator shafts 52, four above and four below, as clearly shown. On the shafts 52 outside the bearings 50 are eccentric weights or masses 54, and connecting each pair of aligned shafts 52 is an eccentrically weighted plate 55. The angular phasing of these unbalanced weights on the different pairs of aligned shafts 52 will be explained hereinafter. It may be noted at this point, however, that the eccentric weights 54 are individually angularly adjustable on the shafts 52, and thus angularly adjustable to the eccentrically weighted plates 55 which, for example, may be fixed on the shaft 52. Thus the eccentric weights 54 may be positioned so that their impulse is additive to that of plates 55 (FIGS. 2–4), or by rotation adjustment of the weights 54 through 180° relative to the plates 55, the impulse of the plates 55 is subtractive from that of weights 54. FIG. 1 illustrates a case in which the plates are so positioned relative to the weights 54 as to provide a resultant impulse at a phase angle between those of the weights 54 and the plates 55. Thus large freedom for regulation of phase angle and impulse is afforded.

Each shaft 52, outside the corresponding unbalanced weight 54, is coupled through a universal joint 58 to one end of a horizontal drive shaft 59, the other end of which is connected through a second universal joint 60 to the hub of a gear inside the gear housing 12 or 13, as the case may be.

It will be seen that there are four shafts 59, two upper and two lower, driven from gears inside each of gear housings 12 and 13. The gear trains are similar inside the two gear housings 12 and 13, and that illustrated in FIG. 8 will serve for both.

With reference to FIG. 8, for driving the two upper shafts 59, there are two oppositely rotating gears 62, which mesh with idler gears 63 driving gears 64 which are aligned with and drive the lower pair of shafts 59. Thus the upper and lower shafts 59 on each side are rotated in the same direction, while the shafts 59 on opposite sides rotate in counterdirections. Meshing with the two gears 62 are two gears 65, which also mesh with each other. One of the gears 65 is on a shaft 66 driven by a prime mover 68. As will be seen, there are two prime movers 68, each having a drive shaft 66 which mounts the corresponding gear 65, and thus drives the complete drive train within the respective gear housing 12 or 13, as the case may be.

The prime movers 68 are, in the preferred embodiment of the invention, a pair of gas turbines, which, as here shown, are mounted by means of hangers 70 on the frame pipe 14.

As will be evident, the combination of unbalanced rotating weights of the oscillator will produce various resultant forces in the oscillator frame, to be applied to the pipe or stem 18, depending upon the relative directions of rotation of the shafts on which the unbalanced weights are mounted, and also upon the relative angular positions, or "phasing," of these unbalanced weights. Thus, as will be described presently, the final resultant force applied to the stem 18 may be an alternating force oriented along a direction line longitudinally of said stem, or transversely thereof, or, as other examples, but without limitation, torsionally of the stem, or simultaneously both longitudinally of the stem and torsionally thereof.

The first example, and that illustrated in FIGS. 2–4, produces a maximized alternating force oriented longitudinally of the pipe or stem 18. Referring to FIGS. 2 and 8, and to the gear train illustrated in FIG. 8, it will be clear that the respective upper and lower driving gears 62 and 64 for the upper and lower unbalanced-weight-driving shafts 59 on one side of the oscillator are both driven in one direction of rotation, while the upper and lower driving gears 62 and 64 for the unbalanced-weight-driving shafts 59 on the opposite side of the oscillator are driven in the opposite direction of rotation, all being driven at the same r.p.m. It will be evident that the shafts 59 are also driven in these same directions of rotation by the other gas turbine 68 through a gear train in housing 13 corresponding to the gear train in housing 12.

With these directions of rotations of the four shafts 59 established, the eccentrically balanced weights 54 and 55 are all so angularly related or "phased" on the shafts 52, 59 as to move vertically in unison with one another, and horizontally in opposition to one another, so that the vertical components of force generated by the unbalanced weights will be additive, while the horizontal components of force are cancelled. This is accomplished if all the weights pass through their uppermost and lowermost position in unison.

Accordingly, the complete set of rotating unbalanced weights creates in the frame of the oscillator a vertically oriented alternating output force; and, with the frame of the oscillator clamped to the upper extremity of the elastic pipe or stem 18, this vertically oriented output force is exerted on the stem 18. Preferably the alternating output force from the oscillator is generated at a frequency corresponding to the frequency of a mode of resonant longitudinal standing wave vibration for the stem 18, and by so doing, the stem 18 is set into longitudinal resonant standing wave vibration, such as diagrammed at $st$ in FIG. 1. In this standing wave, a velocity antinode V occurs at the upper extremity of the stem 18, and also at the mid-point, where the clamp 20 is situated. Thus the clamp 20 vibrates with large amplitude, and thus exerts an alternating force on any device clamped thereby, such as a vertical column 26 of a building structure. The point of the pipe 18 carrying the clamping means 20 is the point at which suitable impedance matching should be made to the building component to which the clamp means 20 is attached. This impedance matching step will be further discussed hereinafter. It should be cautioned at this point that the standing wave diagrammed in FIG. 1 is somewhat idealized, and that in many instances in practice, the wave will be substantially modified in form, with shifting of the nodes and antinodes, by the mass and elastic characteristics of the building structure. Thus, in some cases, at the operating frequency of the oscillator, the building structure may be mass-dominated, and in others, elasticity-dominated, the vibration in the building being thus off the peak of resonance in one direction or the other, depending upon these characteristics. In such cases, the "load" constituted by the building is not a pure resistance, and a mass or an elastic compliance type of reactance is encountered by the vibratory coupling oscillator stem, with corresponding modification of the standing wave pattern in said stem.

Reference is next directed to FIGS. 4a and 9 showing an alternative phasing of the unbalanced weights, so as to deliver a horizontally oriented alternating output force. Here, corresponding parts will be identified by the same reference numerals as used before, but with the subscript "a" added. It will be understood that, as in FIGS. 2–4, there are actually eight of the unbalanced weights, half of these in a plane behind that of the weights shown, and aligned with and therefore hidden by the latter. The weights in the plane behind will also be understood to turn in the same directions as the aligned weights in front in all cases. In this case, the two upper unbalanced weights 54a of the front four turn in the same direction of rotation, while the two lower weights 54a turn at the same r.p.m. in the opposite direction of rotation. All of the unbalanced weights 54a are positioned at the same angle on the upper shafts, and move horizontally in unison as well as vertically in unison. All of the unbalanced weights 54a on the lower shafts are positioned at the same angles relative to one another, and move in unison both horizontally and vertically relative to one another. However, the upper and lower unbalanced weights 54a are positioned with ninety degrees phase angle between them, and, owing to the opposite directions of rotation of the lower weights relative to the upper weights, all of the unbalanced weights move horizontally in unison, while all upper unbalanced weights are opposed in their vertical movements by equal and opposed movements of the respective lower unbalanced weights. Accordingly, the unbalanced weights generate horizontal components of force which are additive and create a large resultant horizontal alternating force within the oscillator frame. At the same time, the vertically oriented components of force are evidently cancelled out. Therefore, the modification here described has an output force applied from the oscillator frame to the output stem 18, and thence to the clamping device 20, which is alternating in character and horizontally oriented. This horizontal alternating force is applied to any building component to which the clamp device 20 is applied. As in the first case, it is preferred to operate at a frequency at which a resonant standing wave is created in the stem 18, though in this case the standing wave is in a lateral or bending mode. The clamp is at an antinode of this standing wave, and the difference from the first case is primarily the application of a horizontally directed alternating force to the building structure.

FIG. 9 shows, largely diagrammatically, a modification of the driving gear train of FIG. 8, incorporating certain additional idler gears, as clearly shown, for accomplishment of the desired turning directions for the weights 54a, as represented in FIG. 4a.

FIG. 10 is a diagrammatic perspective view of a modified oscillator generally similar to those heretofore described and illustrated, but with a modified arrangement of unbalanced weights or rotors 44b, such as to yield an alternating output force in a vertically oriented direction, in combination with an alternating torsional force oriented about a vertical axis. In this figure, the frame of the oscillator of the former figures is represented diagrammatically by the rectangular framework F, and it will be understood that this framework can be the same as that of the earlier figures, and will be understood to be equipped with the elastic output stem such as 18 including the clamp means such as 20 or equivalent for application to a component of the building structure. The figure shows four shafts 52b for carrying unbalanced weights, two upper shafts and two lower shafts, in the same general arrangements as the weight-carrying shafts of FIGS. 1–4. The two upper shafts are rotated in the same direction, and the two lower shafts in the opposite direction, using for this purpose a gear train which may be like that shown in FIG. 9. The figure shows a vertical longitudinal centerline or axis L understood to pass through the center of gravity of the oscillator, and the portions of the two upper shafts 52b on one side of this axis L—L as viewed in the direction of the arrow D, carry unbalanced weights 54b which are oriented at the same angles on their shafts. The two lower shafts 52b carry, on the opposite side of said centerline L—L, a pair of unbalanced weights 54b which are displaced by a phase angle of 180° from the weights 54b on the upper shaft. A consideration of FIG. 10, with attention given to the relative directions of rotations of the several shafts, will now show that the unbalanced weights 54b on the upper shafts move both vertically and horizontally in unison with one another, creating a vertically oriented additive alternating force component, and creating also a horizontally oriented additive or resultant alternating force component. Also, because this alternating force component is to one side of the center of gravity of the oscillator frame, the horizontally alternating force component creates an alternating couple, or in other words, an alternating torsional force. Giving attention now to the two unbalanced weights 54b on the two lower shafts 52b, it will be clear that they produce a vertically oriented alternating force which is additive with that of the upper unbalanced weights 54b, a horizontally oriented alternating force which opposes and cancels the horizontal force from the upper weights, and that they also produce a force couple which is additive to that owing to upper unbalanced weights 54b. The resultant output force from the oscillator, and applied through the output means to the building component to be vibrator, thus comprises an alternating vertically oriented force, combined with an alternating force couple or torsion about the vertical axle of symmetry L—L. The oscillator can be operated at a frequency to create a longitudinal resonant standing wave in the elastic output stem, as before, on which will be superimposed an alternating torsion, or at a different frequency to create a torsional resonant standing wave, with augmented torsional amplitude, and of course, somewhat reduced longitudinal vibration amplitude.

Reference is next directed to FIG. 11, which is similar to FIG. 10, but shows four additional unbalanced weights 54b on those ends of the shafts which were un-weighted in FIG. 10. Each added weight 54b is angularly displaced or phased by 180° from the other weight on its shaft. Considering the effect of the added weights, it will be readily apparent that the vertical components of force of the original weights are counteracted and cancelled by those of the new weights. The new weights, on the other hand, act additively in each case with the horizontal force components of the weights on their corresponding sides of the centerline L—L, and thus the resultant force couple or torsional resultant alternating force is doubled. This version of the oscillator then has a strong torsional force, producing a strong torsional resonant standing wave in the elastic stem, and applying a corresponding torsional output force or couple to whatever may be engaged by the clamp on the torsionally vibrating stem.

The rotor arrangements described in the foregoing produce substantially sinusoidal output forces. Of course, the conditions of generation are such as will generally produce certain harmonics or irregularities of pattern. These irregularities may be greatly augmented and multidirectional force components generated by the expedient of introducing angular displacements or phase differences between individual unbalanced weights. The unbalanced weights are thus preferably so made as to permit easy angular adjustment on their shafts. In the embodiment here shown (see FIG. 4), the weights 54 are split, as at 54', in to the apertures which receive the mounting shafts, and the weights are tightly clamped on the shafts by means of screws 54" passing through lugs on opposite sides of the split. By loosening these screws, the weights may easily be angularly adjusted on the shafts. Clearly, the weights may thus be adjusted angularly about the shafts and thus angularly relative to one another, as well as to the eccentrically weighted plates 55, and an infinite variety of phase differences, of large or small extent, as well as regulation of impulse, thus introduced. By this means, vibrational forces can be developed and applied to the building structure with an almost infinite variety of directional output.

It will also be seen that the rotor system of FIGS. 4a and 9 can be converted to that of FIG. 11 simply by adjustment of the angular positions of individual unbalanced weights, this following from the fact that the shafts that carry the unbalanced weights turn in the same directions in both cases. It will be further understood by those skilled in the art that, if desired, shifting gear transmissions can readily be provided by which the shaft directions of the initial embodiment, i.e. FIGS. 1–4 and 8, can be converted to that of FIGS. 4a and 9. Also, as will be evident, the gear trains may include step-up or step-down transmission means.

In FIGS. 1 and 1a, the sonic machine of the invention is shown suspended adjacent a building structure B indicated in phantom lines. It will be understood that in the performance and application of the invention, the sonic machine will be suspended by the cable 16 from a crane, and the latter maneuvered to bring the clamping jaws of the output clamp 20 into position to be clamped to a column or other component of the building structure. In FIGS. 1, 1a, 4 and 5, the clamping jaws are shown as clamped to such a column 26, at a mid-point between the connection and fastening thereto of two horizontal components h of the structure (FIG. 1a). It is a further feature of the invention that the clamping jaws of the machine be applied to a component of the building structure which has a relatively low impedance in relation to other portions of the building structure. That is to say, and it being understood that the components such as 26 and h have both mass and elasticity, the point of clamping to the building structure should be to a relatively vibratory point of a member such as 26 which will respond by a substantial amplitude of elastic vibratory deformation to the cyclic force impulse delivered by the sonic machine of the invention. The preferred clamping point is generally the mid-point region of such a member as 26 between horizontal components such as h. Impedance will be recalled to refer to the ratio of cyclic force amplitude to cyclic elastic deformation, and it is the purpose to clamp the building structure at a point of relatively low impedance, i.e. where a large amplitude of cyclic elastic deformation or bending will be obtained under the cyclic force applied by the sonic machine. It should be clear that ordinarily the unsupported midpoint of a stretch of column will have a lower impedance than will a point on the column near a supported or cross-braced portion of the column. In other words, the sonic machine will normally be clamped to a selected building column at a selected unsupported intermediate point therealong substantially spaced from rigid or cross-braced portions thereof, as suggested in FIG. 1a.

Also, as previously mentioned, it is desirable, for high sonic energy transmission into the building structure, and consequent rapid demolition, that there be an impedance match or adjustment between the output coupling means associated with the oscillator and the component of the building structure to which the coupling is made. The present invention provides for this desirable impedance adjustment, as will become clear in the course of the following discussion. As earlier described, it is highly desirable that the operation of weakening and collapsing the building make use of a high-energy sonic resonant standing wave pattern of vibration throughout the building structure. Any given building structure will normally have a substantial number of natural resonant frequencies or periods for a given mode or location of vibration input. Since the building may be vibrated in a number of different resonant or near-resonant standing wave modes, depending upon the frequency direction of cyclic input force application, and input point of alternating force application, the invention contemplates a selection in the first instance of a sonic machine capable of operation throughout a substantial range of frequencies bracketing the range of natural resonant frequencies commonly encountered in building structures.

The sonic machine of the invention thus is designed to produce rotation of the unbalanced-weight shafts within a practical range of frequencies commonly encountered. The prime movers and gear trains are necessarily designed and selected to produce the output frequencies required in practice. A gas turbine type of prime mover is ideally suited to the purpose, affording a range of easily selected or controlled output frequencies. A large cyclic output force is evidently called for, and is best attained by use of a substantial number of unbalanced weights such as here provided. The output force from any given unbalanced weight depends upon the product of the radius of the center of gravity of the unbalanced mass, the unbalanced mass, and the revolutions per minute of the unbalanced mass, or in other words, the cyclic frequency. The present machine has a substantial number of such unbalanced masses, and at the cyclic frequencies called for, i.e. the resonant frequencies of the building structure, high unbalanced cyclic forces are developed. These high cyclic forces are transmitted through the steel coupling pipe or stem 18 to the clamping means 20 and thence to the selected low-impedance region of the buliding structure to which clamping engagement is made. The coupling stem 18 is longitudinally elastic, and acts as a stiff spring or compliance between the force generating portion of the oscillator and the output means or clamp 20. One advantage of such a compliance is that its reactance tends to counteract the mass reactance of the oscillator structure and clamping means, so that force otherwise consumed in vibrating this somewhat massive structure is conserved. Considering now the clamp structure 20 on the elastic coupling stem 18, in this case at the velocity antinode at the mid-region of the stem, it will be seen that an acoustic impedance is presented thereat, represented by the ratio of alternating force available for application to the building structure at the clamp 20 to the vibration amplitude of the stem at their clamp 20. A desirable impedance adjustment is secured if the impedance at this clamp on the stem 18 is near or adjusted somewhat to the impedance of the component of the building structure to which clamping engagement is made. Under these circumstances, the high sonic energy developed by the oscillator flows into the building structure, and the acoustic circuit or network constituted thereby is sonically activated to a maximum extent. A step in the performance of the invention is of course an adjustment of the output frequency of the oscillator to match a resonant standing wave frequency pattern of the building structure, and when this is accomplished, either exactly or approximately, vibration amplitudes within the building structure are augmented very materially, leading rapidly to distortions, fracture and fatigue failure as heretofore mentioned.

The immediately foregoing discussion has of course assumed a vertically oriented alternating force, i.e. a longitudinal compressional wave train, transmitted down the elastic stem 18 to the building structure. Horizontal or lateral resonant or non-resonant modes of vibration as well as torsional modes, and torsional modes in combination with longitudinal modes, with additional variations accomplished by individual adjustments of the unbalanced weights relative to one another, are also within the scope of the invention and will now be understood without further discussion.

The elastic coupling stem 18 should be selected properly for the characteristics of the building structure to be demolished. In this connection, it is desirable in many cases to use a coupling stem 18 which has and will operate at a resonant standing wave frequency equal or close to the resonant building structure frequency to be excited; or, often in practice, which is close to a vibration frequency at which the building is known or suspected to be resonant, or at which similar buildings are known by experience to have a resonant frequency.

The establishment of a resonant standing wave frequency in the stem for the frequency of operation has the advantage that, at resonance, otherwise force-consuming masses of the vibrating oscillator and clamp means are counteracted by the elasticity in the stem, i.e., the mass reactances are balanced by the elastic compliance reactance, so that a maximized alternating force is applied from the oscillator and its coupling stem to the building structure.

On the other hand, in some applications, resonance in the coupling stem is not particularly sought, and the stem may be considerably shortened, and/or made stiffer, or more massive, or solid. With a non-resonant stem, but one which is elastically deformable, for example, desirable impedance adjustment to a building structure component is still feasible and highly desirable for good sonic energy transference. When the building structure has a large elastic compliance reactance (high stiffness) for the easily available frequency range of the oscillator, for example, a massive coupling stem can be made to cooperate with the acoustic circuit of the building to provide an over-all condition of resonance in the total system or circuit comprised of the oscillator with its coupling stem and the vibratory building. On the other hand, with a building structure of high or relatively high mass reactance, an over-all resonance can be achieved with a short and elastically stiff coupling stem. Of course, in the last two cases, over-all resonance is established, with the building vibrating at a resonant standing wave frequency, but without essential resonance, excepting as a part of the over-all system, in the oscillator and coupling stem unit per se. This is often of advantage for building structures having many suspected resonant frequencies which are to be explored, found and utilized, with the system as a whole then operated at resonance or near or in the general region of resonance for the shake-down operation.

On the other hand, when the desirable frequency of operation is approximately known or can easily be determined or estimated, then a coupling stem having a resonant frequency (when taken, of course, with the masses of the oscillator and clamp means) is an important advantage, as it facilitates and leads to maximized force amplitude at the point of cyclic force input to the building structure, to good impedance matching, and to stabilized operation at high energy delivery rate.

The invention has various important advantages as explained in the foregoing specification, and it will be understood that these can be carried out with equipment typified by that described in the foregoing specification and illustrated in the drawings. It will further be understood, however, that the specific embodiments of the invention disclosed herein are merely typical and not restrictive on the broad invention, and that various changes in design, structure and arrangement may be made without departing from the spirit and scope of the invention or of the appended claims.

I claim:

1. The process of demolition of building structures and the like such as are composed of a multiplicity of interconnected components having characteristics of mass and elasticity, and which afford the structure with a capability of vibrating in a resonant standing wave pattern, with at least one of said components thereof participating in said vibration pattern with different regions thereof vibrating at high and low impedance relatively to one another, that comprises:

providing a self-contained mechanical oscillator,
   connecting said oscillator to an elastic stem member,
   acoustically coupling said separate elastic stem member to a low-impedance region of said elastic component of said structure, a mechanical oscillator which delivers a cyclic output force thereto, with a component of said force oriented in the direction of vibration of said low-impedance region when said component vibrates in said pattern; and
   driving said oscillator for a sustained time period at a frequency to excite said resonant standing wave pattern in said structure.

2. The process of claim 1, using an oscillator of an orbiting mass type.

3. The subject matter of claim 1, wherein said one elastic component of said building structure is an elongated member, and said oscillator is coupled to said elongated member with an orientation causing said cyclic force to be exerted substantially longitudinally of said member.

4. The subject matter of claim 1, wherein said one elastic component of said building structure is an elongated member, and said oscillator is coupled to said elongated member with an orientation causing said cyclic force to be exerted substantially laterally of said member.

5. The subject matter of claim 1, wherein said one elastic component of said building structure is an elongated member, and said oscillator is coupled to said elongated member with an orientation causing said cyclic force to be exerted on said member as a couple about the direction of elongation thereof, so as to establish torsional vibration of said member.

6. The subject matter of claim 1, wherein said one elastic component is an elongated member which is secured fast in said structure at two spaced points, and said oscillator is acoustically coupled thereto by clamping it to a portion of said member between said two spaced points.

7. A sonic machine for demolition of building structures and the like fabricated of a multiplicity of interconnected components having characteristics of mass and elasticity, and which afford the structure with a capability of vibrating in a resonant standing wave pattern, with at least one of said components participating in said vibration pattern with different regions thereof vibrating at high and low impedance relatively to one another, that comprises:

a self contained mechanical oscillator adapted to deliver a cyclic output force;
   a separate elastic coupling means connected to said oscillator for receiving and transmitting said cyclic output force;
   a cyclic force output clamp on said coupling means for clamping said coupling means to a low-impedance region of said one component of said structure, whereby said cyclic output force is transmitted to said component; and
   means for driving said oscillator at a frequency to excite said resonant standing wave pattern in said structure.

8. The subject matter of claim 7, wherein said coupling means comprises a separate elastic stem, with said oscillator and said cyclic force output clamp spaced from one another longitudinally along said stem.

9. The subject matter of claim 8, wherein said stem has a characteristic of cyclic elastic deformation in relation to transmitted cyclic force substantially adjusted to the impedance of said building component at the point of clamping to the latter.

10. The subject matter of claim 8, wherein said oscillator is arranged relatively to said stem to exert a cyclic force on said stem along a longitudinal axis of the stem.

11. The subject matter of claim 8, wherein said oscillator is arranged relatively to said stem to exert a cyclic force on said stem in a direction laterally of the stem.

12. The subject matter of claim 8, wherein said oscillator is arranged relatively to said stem to exert an alternating couple on said stem about the longitudinal axis of the stem.

13. The subject matter of claim 8, wherein said elastic stem comprises a standing wave resonator, with velocity antinodes at and spaced between its extremities, and with said oscillator connected to said stem adjacent one of said velocity antinodes, and said cyclic force output clamp on said stem adjacent another of said velocity antinodes.

14. The subject matter of claim 7, wherein said oscillator comprises a plurality of selectively phased rotating unbalanced weights.

15. The subject matter of claim 14, wherein said unbalanced weights are angularly adjustable about their axes of rotation relative to one another.

References Cited
UNITED STATES PATENTS 3,344,995  10/1967  Koetters _____ 241—1

ANDREW R. JUHASZ, Primary Examiner

FRANK T. YOST, Assistant Examiner

U.S. Cl. X.R.

74—61; 241—30, 301